Nov. 5, 1940.    M. H. MacKUSICK    2,220,576
METHOD OF ARC WELDING
Original Filed July 1, 1936
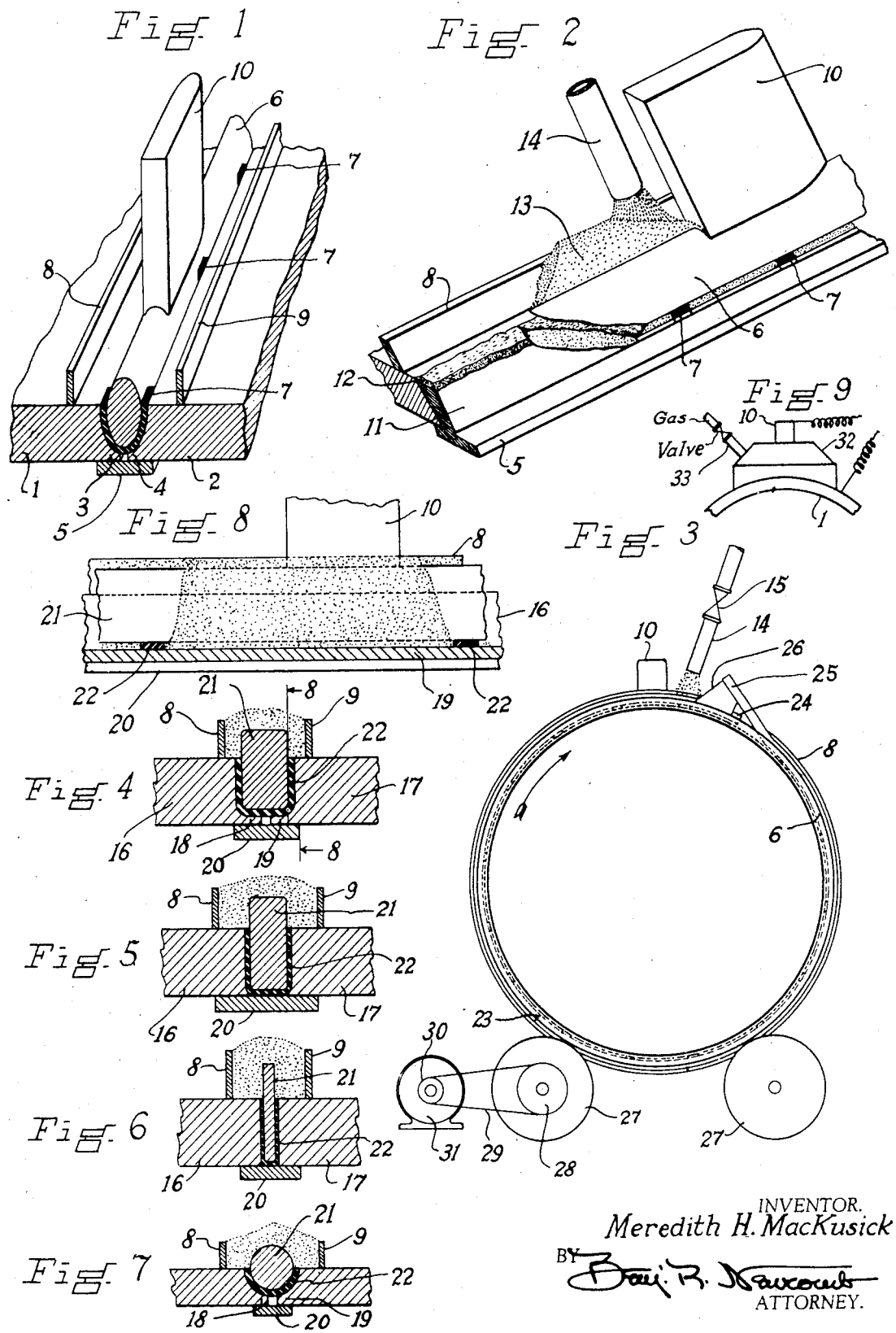
INVENTOR.
Meredith H. MacKusick
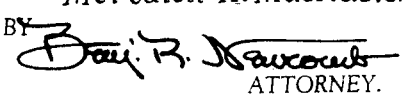
ATTORNEY.

Patented Nov. 5, 1940

2,220,576

UNITED STATES PATENT OFFICE 2,220,576

METHOD OF ARC WELDING

Meredith H. MacKusick, Fairlawn, Ohio, assignor to The Babcock & Wilcox Company, Newark, N. J., a corporation of New Jersey Continuation of application Serial No. 88,311, July 1, 1936. This application August 13, 1938, Serial No. 224,818

3 Claims. (Cl. 219—10)

This invention is a method of performing automatic electric arc deposit of weld metal at high rates of deposition, the resulting union being free of cracks, high in density with a minimum of contamination, and without material detraction from the physical and chemical properties of the parent metal, or from the original metal from which the deposit is laid down.

It has been, and now is, the custom in automatic electric arc welding to form an arc between an upright weldrod and the work piece in a manner to deposit metal from the weldrod integrally with the work piece, and various means have been resorted to, such as covered weldrods, gas envelopes, powdered fluxes and the like to effectively shield the arc from the atmosphere so that inclusions of oxides and nitrogen compounds, and detraction from the physical and chemical properties of the parent metal, as well as that of the deposit may be reduced to a minimum.

Also it has been the practice to feed the weldrod toward the arc and regulate the current characteristics in a manner to produce a uniform rate of deposit, but such apparatus is complicated and the sensitivity of the arc is not equally reflected in the mechanism for the weldrod feeding and hence there is a hunting effect as to the arc length with the result that it is difficult to secure uniform results, especially with metal work of one-half inch thickness and greater, and also the rates of deposit to secure good results are necessarily slow with a consequent high cost per pound of sound weld metal deposited, thus materially adding to the cost of fabricating welded articles.

It has more recently been proposed, in the prior art, to lace a covered weldrod horizontally along, or parallel with, a butted seam, start the arc at one end of the weldrod and permit it to be consumed while keeping a current feeding contact in contact with a bare portion of the rod in advance of the arcing and thereof by a step-by-step movement along the bare portion which is on the upper side, but such method and apparatus have not been entirely satisfactory due to the fact that the covered rod interposes difficulties in that there is an ever changing condition of the arc due to the character of the coverings which are non-conductors and usually have a detrimental influence on an arc so far as maintaining uniformity throughout the run, and then too the weldrod is above the seam and has a portion bared of covering and which cannot be adequately shielded unless a second shielding element is used or a gas forming envelope provided.

The present invention is an improvement on known methods in that it provides for disposing a bare weldrod, with consequent uniformity of electrical characteristics, within, or at least partially within a narrow welding groove in the work piece instead of on top of it and temporarily insulated from the work piece by means consumed by the arc as it deposits the metal of the weldrod and which may be simply an insulator or may contribute a desirable influence to the operation.

Additionally, the invention contemplates a completely smothered arc, as distinguished from the shielded arc of the prior art such as is sought with covered rods of the slag forming and gas forming variety; and with this invention the arc and resultant metal pool are, throughout the operation, entirely hidden from view and completely shielded by a smothering agency which, in addition to positively excluding oxygen and nitrogen of the air, conceals the arc from view and hence does away with the necessity for unusual protection of the operator's eyes.

Also, by reason of using a bare metal weldrod control of the arc is readily established by a set of predetermined conditions insuring a fixed arc length throughout the run with the result that weldrods of larger diameter with heavier current densities may be used with consequently greater rate of deposition of sound weld metal at a lower cost per unit length of weld than has heretofore been possible, coincident with uniformly better results.

In using the present invention welding speeds of 60 to 100 feet per hour are attainable with single bead deposit, and the chemical analyses of weld deposited metal reveals that the protection from atmospheric contamination is such that a carbon content is obtained in the weld metal which is approximately twice that obtainable with standard prior art methods, and, furthermore, the weld is free of cracks and with a minimum of nitrogen content.

In the drawing accompanying this specification there are illustrated several methods and apparatus for performing the present invention, and—

Fig. 1 is a perspective view of the assembly of the work pieces, welding strip and contact without the smothering agent applied, but with the parts tilted at an angle to maintain only a small horizontal pool of molten metal;

Fig. 2 is a similar view, partly in section;

Fig. 3 is an end view in section of a cylindrical drum mounted for rotation and for welding a groove seam;

Fig. 4 is a transverse section through work pieces and weldrod prepared for welding by the smothered arc method;

Fig. 5 is a view similar to Fig. 4 of another method of assembly;

Fig. 6 is a view similar to Fig. 5 showing how a thin weldrod strip is used;

Fig. 7 is a view similar to Figs. 4, 5 and 6 showing the use of a round weldrod;

Fig. 8 is a typical longitudinal section on line 8—8 of Fig. 4; and

Fig. 9 is a view, partly diagrammatic, showing the manner of concealing an arc smothered with gas as an oxygen inhibiter.

Referring in detail to the drawing, Fig. 1 illustrates the work pieces 1 and 2 which have their sides chamfered or grooved to provide lips 3 and 4 which are brought in proximity but not quite touching and having a backing-up strip 5 applied to the bottom side thereof. A welding strip 6 of oval form is then fitted into the seam groove thus provided and, as shown, is supported by insulators 7 at spaced intervals therealong. These insulator may be of any suitable material, such, for instance, as mica, and are of a thickness selected in accordance with the size of the rod to be used, the character of the metal to be welded, and the current values to be used. They serve to maintain a fixed arcing distance between the parent metal work pieces 1 and 2 and the welding strip. At the top side of the work pieces 1 and 2 are two longitudinal members 8 and 9 spaced apart and tack welded or otherwise secured, and which serve, as will be later described, to provide a receiving trough for pulverulent arc smothering material such, for instance, as a mixture of—

|  | Grams |
|---|---|
| Asbestos | 700 |
| Ferro manganese | 1750 |
| Silica (flint) | 3500 |
| Magnetic iron oxide (Fe$_3$O$_4$) | 1750 |
| Manganese dioxide (MnO$_2$) | 1750 |

At the upper side of the welding strip 6 is a contact member 10, this contact member and the work, including the welding strip, being moved relatively at a rate commensurate with the rate of deposition calculated from the value of current used and the size of the weldrod employed.

There is illustrated in Fig. 2 a partially completed weld, the completed portion being indicated at 11. This portion is overlaid with a covering of slag 12 formed from the fusion of the smothering flux material 13 which is fed through the spout 14 in a regulated manner as by a valve 15 (see Fig. 3) between the arcing end of the weldrod 6 and the contact member 10 and in sufficient quantity to substantially fill the space between the members 8 and 9 and completely smother the arc from view, thereby excluding the atmosphere. After the completion of the weld, which may be made by a single traverse of the contact member 10, or may be made by use of subsequent weldrods 6 similarly placed, the backing-up strip 5 may be removed by chipping, or the like, and a wash weld deposited.

In Fig. 4 there are shown two work pieces 16 and 17 having lips 18 and 19 closed on the under side by a backing-up strip 20 and with a rectangular welding strip 21 placed in the groove and insulated therefrom by the insulating means 22 which may be either of the intermittent strip type, as shown in Figs. 1 or 2, or may be a full strip, if desired. This welding strip 21 is proportioned to stand sufficiently above the surface of the surrounding metal 16 and 17, and, as it is fused into place it takes care of filling the groove regardless of the interposition of the insulating material 22 which is burned away, or consumed during the process. The same is similarly true of the types shown in Figs. 5, 6 and 7 which simply are different forms and consequently bear the same reference numerals as do Fig. 4.

In Fig. 3 a circular drum is shown with the apparatus prepared for welding a circumferential groove seam. In this instance the contact member 10 is located at the top of the apparatus and immediately in advance of it is the delivery spout 14 with its valve 15 for depositing the required quantity of pulverulent slag-forming or other arc-smothering and fluxing material. The members 8 and 9 confining the fluxing material, in this instance, are tack welded to the body structure and are circular in form. The welding rod or strip 6 is made in halves joined together by tack welding, or the like, as at 23, and the starting end 24 is separated from the finishing end by a very small distance, but the finishing end has welded thereto a strip or tang 25 which is bent upwardly, as shown, so that in the final position the welded contact 10 may ride thereupon; this end is insulated from the cylindrical body portion by the bridge member 26 which spans the seam groove. The total cylindrical structure rests upon rollers 27, one of which is provided with a pulley 28 belted as at 29 to the pulley 30 of the motor 31 for driving in the manner to be hereinafter described in connection with Fig. 9.

Now with reference to Fig. 9 there is here shown a cylindrical body similar to that indicated in Fig. 3 but with the apparatus arranged with a hood 32 accommodating the contact member 10 and receiving a supply of gas 33 instead of a solid flux. This hood completely encloses the arc and remains stationary while the cylindrical work piece is revolved in the manner as described in connection with Fig. 3. However, the rate of movement of the cylindrical piece may be regulated by controlling the speed of the electric motor 31 through the medium of the current at the arc, if desired, so that the relative rate is automatically adjusted. This manner of adjustment is performed in the same way as that set forth for controlling the feed of the upright weldrod in the application of James E. Trainer, Ser. No. 730,852, filed June 16, 1934 (now Patent No. 2,135,129, dated Nov. 1, 1938).

In carrying out the invention, while I have described one form of accomplishing relative movement between contact 10 and the work, as shown in Fig. 3, numerous others may be resorted to, as for instance the contact 10 and attendant flux distributor may be moved by a lead screw, or the work may be moved by a lead screw.

Also the powdered flux may be placed over the weldrod and groove throughout the entire length and the contact 10 shaped, as shown, to plow through such flux.

It is preferable to keep the groove narrow in comparison with its depth. Weldrods of ¼" x ½" oval have been satisfactorily used in welding ¾" plate with a groove depth of ½" by ¼" width and with 1100 amperes, and, as before stated, in single bead deposition welding speeds of 60 to 100 feet per hour have been attained.

This application is a continuation of application No. 88,311, filed on July 1, 1936.

While in the foregoing specific features and steps have been described in connection with my invention, it is nevertheless to be understood that I do not limit myself thereto except as the appended claims define the invention in its broadest sense over the prior art.

I claim:

1. The method of arc welding grooved work which comprises sustaining a welding strip lengthwise of the groove in an insulating manner and in uniformly spaced relation to the groove walls throughout the length of the strip and with a substantial area of the strip in cross section disposed within the groove, including the work and strip in a welding circuit, and promoting an arc between an end of the strip and the work whereby the strip is progressively deposited with an arc confined substantially to the area of the end of the welding strip.

2. In a method of fusion welding, juxtaposing workpieces so as to define the sides of a welding groove, fitting a metallic weld strip in the groove and longitudinally thereof with a substantial portion of its body within the cross-sectional confines of the groove and the remainder externally of the groove, maintaining the weld strip electrically insulated from the workpieces and substantially uniformly spaced from the walls of the groove, covering at least a complete transverse section of the weld strip and the weld groove in the welding zone with fluxing material so that the electric arc is smothered during the welding operation, including the strip and the work in an electric welding circuit with an electric terminal in contact with the weld strip, establishing an arc between the workpieces and the weld strip, and causing the terminal to move along the weld strip and through the fluxing material as the weld strip is fused and the weld formed.

3. A fusion welding method which comprises the juxtapositioning of workpieces so as to define the sides of a welding groove, fitting a bare metal weld strip in the groove and longitudinally thereof with a substantial portion of its body within the cross sectional confines of the groove and a portion externally thereof sufficient to complete the filling of the groove when the weld is completed and simultaneously insulating the weld strip from the workpieces and thereby maintaining the weld strip substantially uniformly spaced from the groove walls, establishing electrical contact between a welding circuit terminal and the strip, establishing an electric arc between the weld strip and the workpieces by completing a welding circuit through the weld strip and the workpieces, effecting relative movement between the weld strip and the welding circuit terminal in contact with the strip longitudinally of the groove, and simultaneously and synchronously effecting a progressive covering at least a complete section of the weld strip and the groove and filling the arcing space by the deposition of flowable fluxing material which completely smothers the arc, and retaining the fluxing material in such covering and filling relationship.

MEREDITH H. MacKUSICK.